May 27, 1924.
M. H. CHURCHILL-SHANN
VEHICLE
Filed June 18, 1920 6 Sheets-Sheet 4
1,495,448
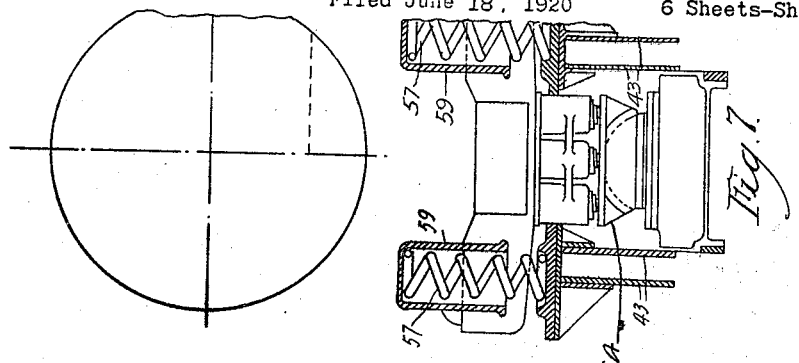
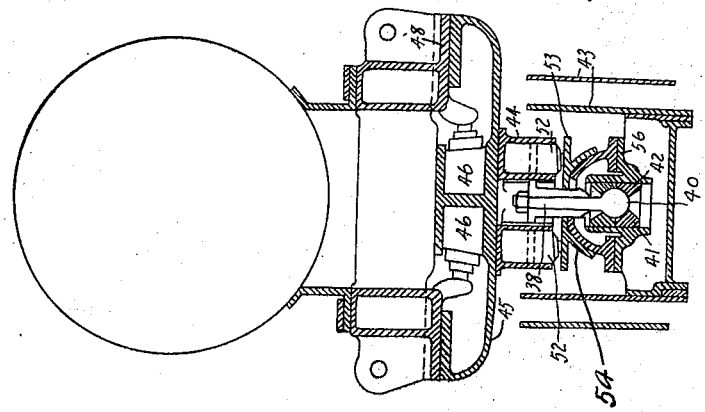
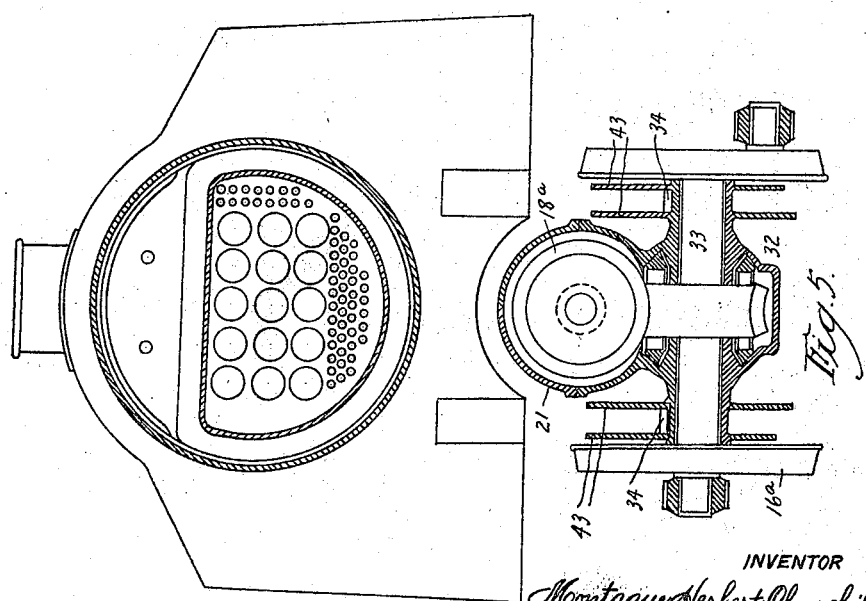
INVENTOR
Montague Herbert Churchill Shann
BY
HIS ATTORNEYS May 27, 1924.

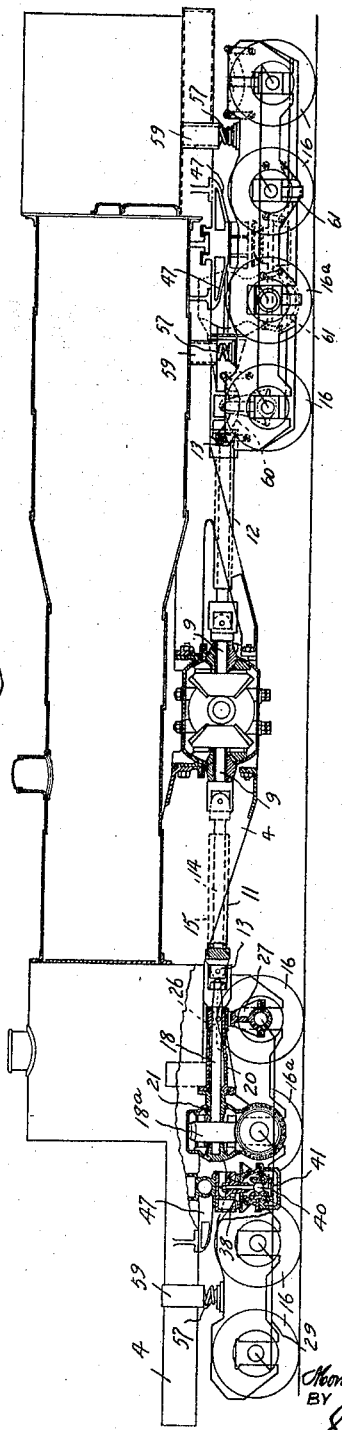

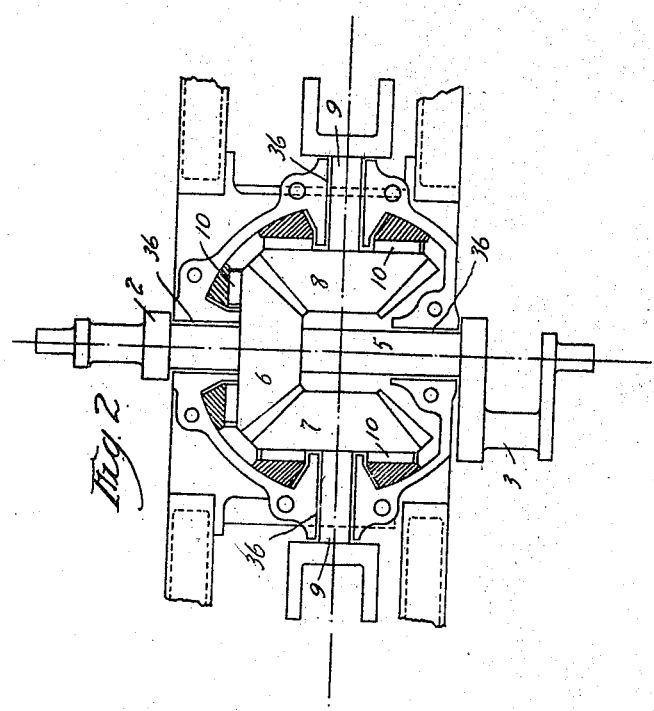
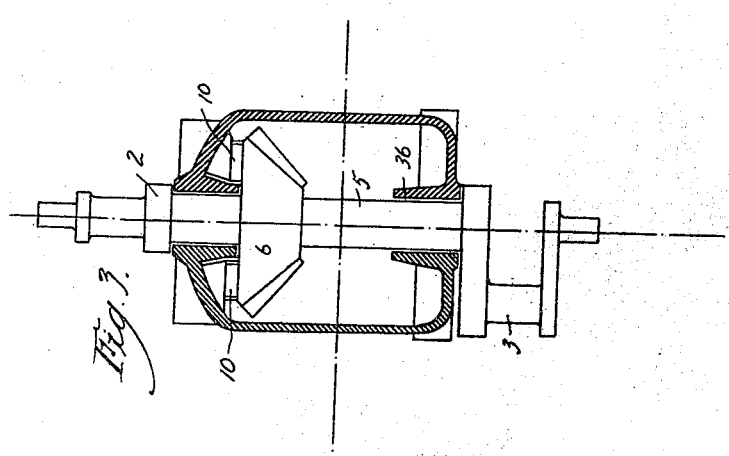

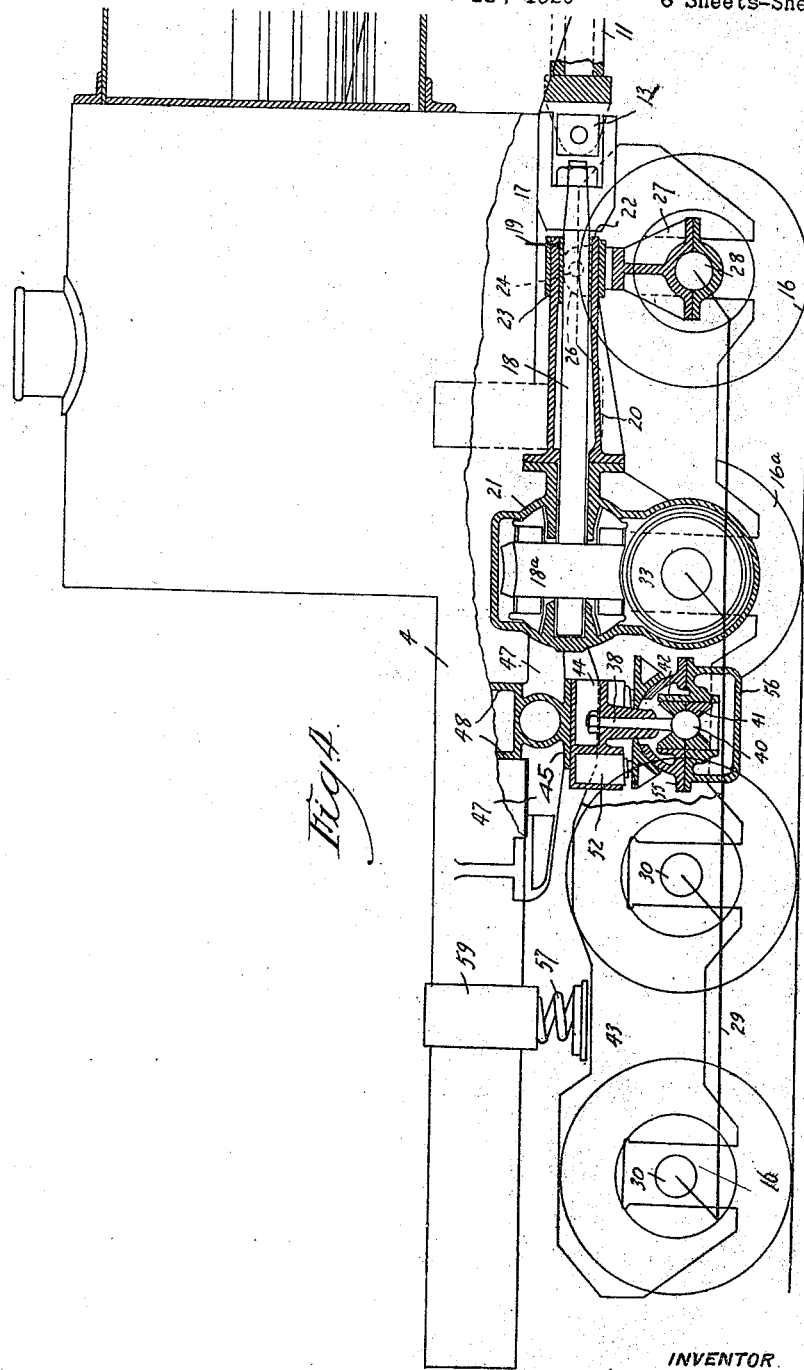

M. H. CHURCHILL-SHANN

VEHICLE

Filed June 18, 1920

INVENTOR
Montague Herbert Churchill-Shann
BY
HIS ATTORNEYS

May 27, 1924. 1,495,448
M. H. CHURCHILL-SHANN
VEHICLE
Filed June 18, 1920    6 Sheets-Sheet 6
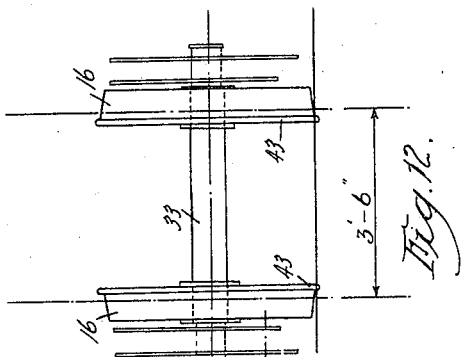
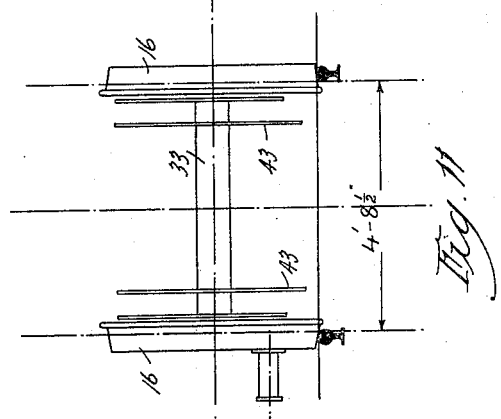
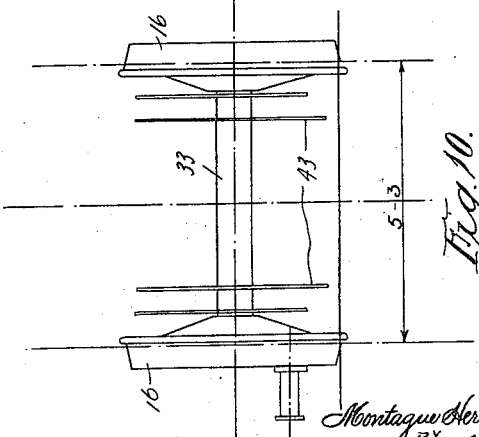
INVENTOR
Montague Herbert Churchill Shann
BY
HIS ATTORNEYS Patented May 27, 1924.

1,495,448

UNITED STATES PATENT OFFICE.

MONTAGUE HERBERT CHURCHILL-SHANN, OF WODONGA, VICTORIA, AUSTRALIA.

VEHICLE.

Application filed June 18, 1920. Serial No. 389,795.

*To all whom it may concern:*

Be it known that I, MONTAGUE HERBERT CHURCHILL-SHANN, a subject of the King of Great Britain, residing at Wodonga, in the State of Victoria, Australia, have invented certain new and useful Improvements in Vehicles; and I do declare the following to be a full, clear, and exact description of the invention, such as will enable others skilled in the art to which it appertains to make and use the same.

This invention relates to double bogie power driven vehicles and to the construction of spring suspension and the mechanical means of transmitting power to the wheels of such vehicles both for rail and road use to insure safety in operation.

At present steam locomotives have a direct drive on the driving wheels and the inequalities of a finite connecting rod or the expansion of the steam or the inertia of the reciprocating parts all cause oscillation. Should track inequalities happen to cause a bump that harmonizes with the oscillation due to any or all of the above causes dangerous swaying may result.

The object of my invention is to enable heavy and powerful locomotives to travel safely over light and inferior tracks or to enable heavy road vehicles to travel over rough roads without dangerous oscillation. The main drive of my improved steam locomotive is preferably by a pair of cylinders operating two cranks at right angles on a shaft running on rigid bearings. This enables much smaller clearances of piston to cylinder end to be safely used.

It also enables forced lubrication with an enclosed engine to be used for the crank pin, and small end bearings and also the valve gear similar to the well known Bellis system, hence the knock can be eliminated in a way it cannot in open engines. Further, with heavy sand storms it prevents disastrous cutting of the bearings due to sand and dust.

In order that my invention may be the more easily understood reference will be made to the accompanying sheets of drawings in which—

Fig. 1 is a longitudinal part section of a locomotive.

Fig. 2 is a plan view of the main bevel drive and crank shaft.

Fig. 3 is a vertical cross section of Figure 2.

Fig. 4 is an enlarged view of the bogie pin spherical seat the helical springs the damping springs and the spider frame on cross slide and the link combination for taking up the reactive effort of the drive of the helical gear on another axle.

Fig. 5 is a cross section through the helical drive showing the bearings of the shaft being carried in axle bearings in horn plates.

Fig. 6 shows the cross section through the bogie pin and cross slide.

Fig. 7 shows a cross section through the damping springs.

Figure 8:
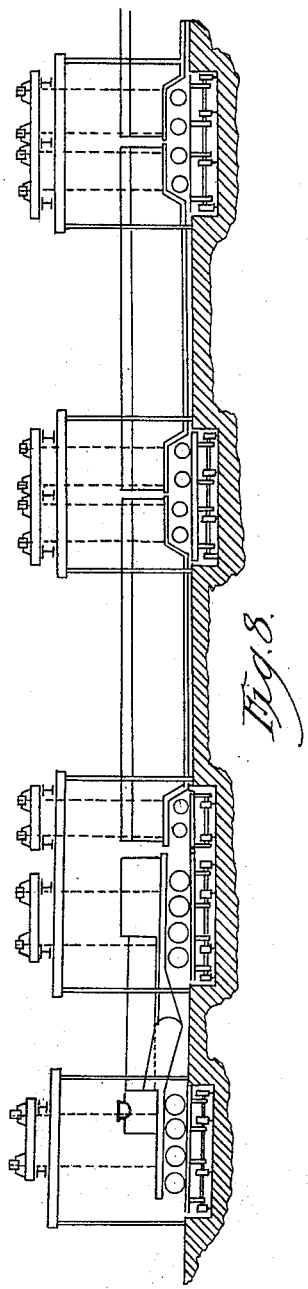
Fig. 8 is a side view of my invention when used as a unified rolling stock including locomotives that may be adjusted from one gauge to another.
Figure 9:
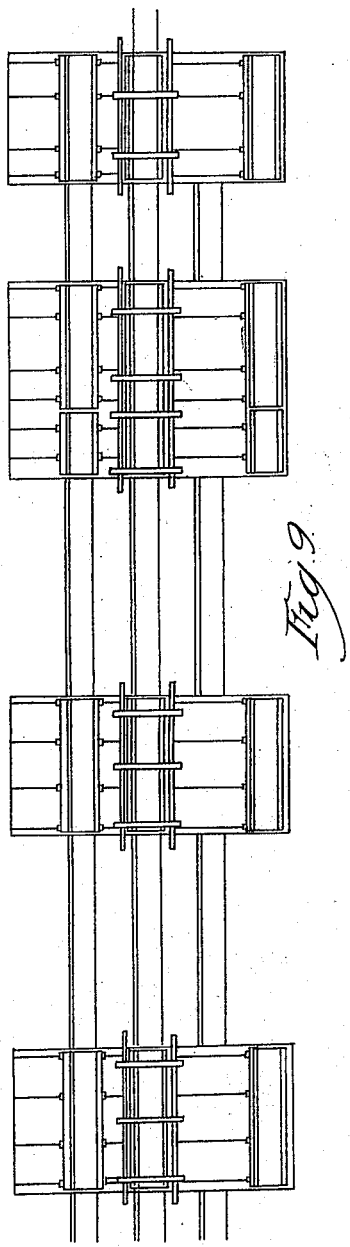
Fig. 9 is a plan view of Figure 8.

Figs. 10, 11 and 12 show the two classes of bogies to fit the three gauges. The two larger gauges have the same frame and bogies the centre of the wheels on the 5—3 gauge being coned to fit so that the 5—3 gauge has the same bogie frame as the 4—8½ gauge. The 3—6 gauge bogie has outside frames whereas the other two have inside frames. The rolling stock other than locomotive is shown as having only two axles per bogie. I do not limit my invention to such an arrangement. The non-locomotive rolling stock may have four wheels or it may in some cases have the same pattern bogie as the locomotive, the only disadvantage being that very long carriages or trucks have to be employed. It has the advantage that the loss of one wheel does not entirely cripple the entire train as the bogie can crawl on three wheels.

In my invention I prefer to employ two pairs of ordinary dash pots (not shown) or other similar means at right angles to the line of the main cylinder so as to obtain perfect balance of the inertia of the moving parts in combination with the balanced weight on each crank 2 at 180° from the crank pin 3. Thus the stress due to inertia or varying expansion being balanced and closed on the main frame 4 cannot set up any swaying either in a horizontal or vertical direction. Hence there can be no synchronizing of oscillation due to the track because the engine can produce no oscillation by itself.

On the main working shaft 5 I prefer to provide a bevel wheel 6 and two other bevel wheels 7 and 8 of opposite sense, the axis of the shafts 9 of these latter being in a horizontal longitudinal direction.

The thrust of the main shaft bevel wheel 6 and the other two driven bevel wheels 7 and 8 I take up on roller face collars 10. Provision is thus made that the variation of turning movement be in reverse directions on the two Cardan shafts 11 and 12 which the bevel wheels 7 and 8 are connected with. These two Cardan shafts 11 and 12 I provide with a universal joint 13 at each end and a sliding rod 14 in a tube 15. Each set of bogie wheels 16 has thus a reverse transverse couple due to the reverse reaction of the Cardan shafts 11 and 12 due to the reverse direction of rotation of such Cardan shafts, but the bogie wheels 16 are made to revolve in the same direction by a right and left handed helical gear respectively.

At the farther end of each Cardan shaft 11 and 12 the fork 17 of the universal joint 13 is connected to a shaft 18 on which a helical wheel 18$^a$ is secured. This shaft 18 with the fork 17 of the universal joint runs in a bearing 19 which has a conical tube 20 strongly secured to the casing 21 around the helical gearing. This conical tube 20 takes up the reactive effect of the helical gearing and prevents it from rotating in a reverse direction to the shaft driven by the helical gearing on which the main driving pair of wheels are secured. The conical tube has a cylindrical portion 22 secured in a sleeve 23 inside of which is the bearing 19 in which the forked shaft 18 rotates. This sleeve 23 has a pin 24 on each of its outer sides and these pins 24 work in a fork 26. The latter is secured to a casting or forging 27 the latter being pivoted round the axle 28 of preferably the innermost of the driving wheels 16 on the bogie. Both main driving pairs of wheels 16$^a$ have side coupling rods 29 to the other axles 30 and 28 on the bogie; the casing 21 surrounding the helical gearing on the main driving wheel axle is divided across the shaft in line with the Cardan shaft and also across the axle of the main driving wheels. This casing 21 has tube extensions 32 which form the bearing for the main axle 33; these tubes are carried in horn blocks 34 in the same way as ordinary axles; the side rods 29 having a rotative motion are balanced by blocks in the usual way on the wheels 16 (these blocks being of the usual construction are not shown). Hence by this gearing I reduce any oscillation of the main frame as each bogie has a reactive turning couple in opposite directions. This couple is however slight compared to the tractive effort, as it would be under 10% of the total weight and would be on reverse sides for each bogie. As this method necessitates that the main engine bearing be split somewhat on the line of the thrust I provide bearings 36 with the split at right angles to the line of the thrust so as to provide for wear in the usual manner, but by this method very long bearings are provided and as these work under oil pressure the wear would not be noticeable. To further eliminate oscillation the spring suspension I provide is as follows:—

There are preferably four pairs of wheels on each bogie. The bogie king pin 38 is therefore between two axles, and I prefer to arrange that the tractive effort as measured on the draw bar shall be transmitted through a ball 40 working in spherical bearings 41 such bearings to have a cylindrical slide 42 through which the pressure of the bogie frame 43 is transmitted to the main frame. This permits a vertical movement as between the bogie frame 43 and the ball 40 on the end of the king pin 38, the latter being secured to a casting 44 brought down as close to the ball 40 as possible and to this casting 44 is bolted or secured another casting 45 which has a small transverse motion controlled by helical buffer springs 46 to prevent side shock on entering a curve or passing points, but has no longitudinal movement; further, this casting 45 has arms 47 extending under the main frame to transmit the tractive force without cross binding the slide 48. The locomotive frame 4 can be raised off the slides 48 of this casting 45 by undoing the keep plate bolts, the design being such that the keep plates are only wanted for safety. The weight keeps the casting 45 in the slide 48. The vertical weight is transmitted from the frame 4 to this casting 45 which is bolted to the king pin casting 44. In the latter are the sockets for either three or four helical buffer springs 52, which transmit the vertical weight to a horizontal table 53 with a spherical seat 54 which rests on a portion of a hollow sphere. This portion of a hollow sphere has under it an annular flat seat 55 which works on a corresponding flat lower table 56 which is rigidly secured to the bogie frame 43. The spherical seat is as far as possible concentric with the ball 40 of the king pin 38 and this centre is approximately on the line of the driving wheel axles. The effect of this is that any tilt of the bogie frame 43 causes the line of upward reaction against gravity to be reversed through the centre to the opposite side of the centre of gravity. To counteract this inclination towards the side tilted up I provide spiral springs 57 between the main frame and a turn table of ordinary construction on the bogie frame to give an upward thrust to the main frame on the side tilted up. By adjusting the initial pressure of the springs 57, which I do by packing springs at the bottom of the casing 59 the engine remains steady irrespective of bumps on the track tilting up the bogie frame. The bogie frame I suspend by means of ordinary camber plate springs 60, one to each wheel 16. The two centre wheels of the bogie I prefer to spring by means of springs 61 under the axle and the two outer wheels by means of springs 60 on top. By this arrangement I obtain more room for the bogie attachments and stiffer springs on the inner wheels so that the end tilting of the bogie is distributed equally on the springs without compensating levers, the bogie frame itself becoming the compensating lever. One very important effect of this method is that any bump whether caused by track inequalities or otherwise is halved by the leverage on the spherical seat as far as lifting the dead weight is concerned; this is irrespective of the absorbing effect of the springs and reduces tractive effort to overcome the inertia of lifting the weight to ride over a bump.

The results obtained by the use of the apparatus herein described are due to the equalizing action of the spherical seat connecting the main frame with the bogie frame, and these results are possible due to the action of this construction which permits the bogie member to be tilted laterally on either side and not to alter or affect the compression or action of the main springs between the main frame and the bogie frame, which compression is always maintained substantially in a central direction through the center of this spherical seat. By this construction also the reactive effect against gravity when one end of the bogie frame is raised or tilted will be transferred to the opposite end thereof, whereby, as will be understood, the compression and action of the auxiliary springs is altered by the tilting of the bogie, which action tends to neutralize the oscillating effect which would otherwise be transmitted to the main frame by the tilting in either direction of the bogie frame.

I claim:—

1. In a vehicle, a main frame, a bogie frame, a spherically seated connection between the main frame and the bogie frame, a set of relatively stiff springs between the main frame and a part of the said connection so placed that the same are equally compressed irrespective of the tilting of the bogie frame, and a set of springs which are unequally compressed by the tilting of the bogie frame tending to equalize the oscillation which would otherwise be imparted to the main frame by tilting the said bogie frame.

2. In a vehicle, a main frame, a bogie frame, a revoluble member having a spherical bearing mounted on the said bogie frame, a support member connected to the said main frame and having a spherical base adapted to coact with the said spherical bearing of the revoluble member, a bogie pin, a set of relatively stiff springs extending between the said main frame and the said support member in such a position that the said springs are equally compressed irrespective of the tilt of the bogie frame, and a set of auxiliary springs extending between the main frame and the said auxiliary frame so that the same are unequally compressed by the tilting of the bogie frame tending to equalize the oscillation which would otherwise be imparted to the main frame by tilting the bogie frame.

3. In a vehicle, a main frame, a bogie frame, a turntable revoluble on the bogie frame and having a spherical bearing, a support member below the said main frame and having a spherical base adapted to coact with the said spherical bearing, a bogie pin mounted at one end to turn in a bearing therefor in the said bogie frame, a guide for the said bogie pin, a bearing for the said guide providing for a vertical movement of the said main frame relatively to the bogie frame, a set of relatively stiff springs extending between the main frame and the said support member in such a position that the said springs are equally compressed irrespective of the tilt imparted to the bogie frame, and a set of auxiliary springs extending between the main frame and the said auxiliary frame so that the same are unequally compressed by the tilting of the bogie frame tending to equalize the oscillation which would otherwise be imparted to the main frame by tilting the bogie frame.

4. In a vehicle, a main frame, a bogie frame, a transverse slide having arms longitudinally of the main frame on which the latter rests, springs to yieldingly hold said slide against transverse movement, a bogie pin casting on which said slide is mounted, a bogie pin having a spherical end mounted in said casting, a slide in which said spherical end is mounted, means to support said slide, a spherical bearing substantially concentric with the bogie pin end supported by said means, and coil springs between said bearing and bogie pin casting.

5. In a vehicle, a main frame, a bogie frame, a bogie pin connecting the main frame and bogie and having a spherical head, bearings in which the spherical head of the bogie pin is journaled, slides in which the said bearings are movable vertically, a lower table having a spherical projection, an upper table having a spherical extension adapted to bear upon the said spherical projection, and a plurality of springs extending between the said main frame and the said upper table.

6. In a vehicle, a main frame, a bogie, a slide having arms longitudinally of the main frame on which the latter rests, a bogie pin casting, a bogie pin therein having a spherical end, a slide in which said end has universal movement, means to support said slide, a spherical bearing supported by said means and springs between the bogie pin casting and said bearing.

7. In a vehicle, a main frame, a bogie frame, a bogie pin connecting the main frame and bogie and having a spherical head, bearings in which the spherical head of the bogie pin is journaled, slides in which the said bearings are movable vertically, a lower table having a spherical projection, an upper table having a spherical extension adapted to bear upon the said spherical projection, a plurality of springs extending between the said main frame and the said upper table, sets of wheels mounted in the said bogie, and means for driving the vehicle by transmitting power to one of the said sets of wheels to turn the same.

In testimony whereof I have signed my name to this specification in the presence of two subscribing witnesses.

MONTAGUE HERBERT CHURCHILL-SHANN.

Witnesses:
DULCIA WINDRIDGE,
AUGUSTINE THOMAS MADDEN.